Dec. 3, 1963 R. N. McCLEERY 3,113,190
BELLOWS ACTUATED SWITCH
Filed Jan. 30, 1961
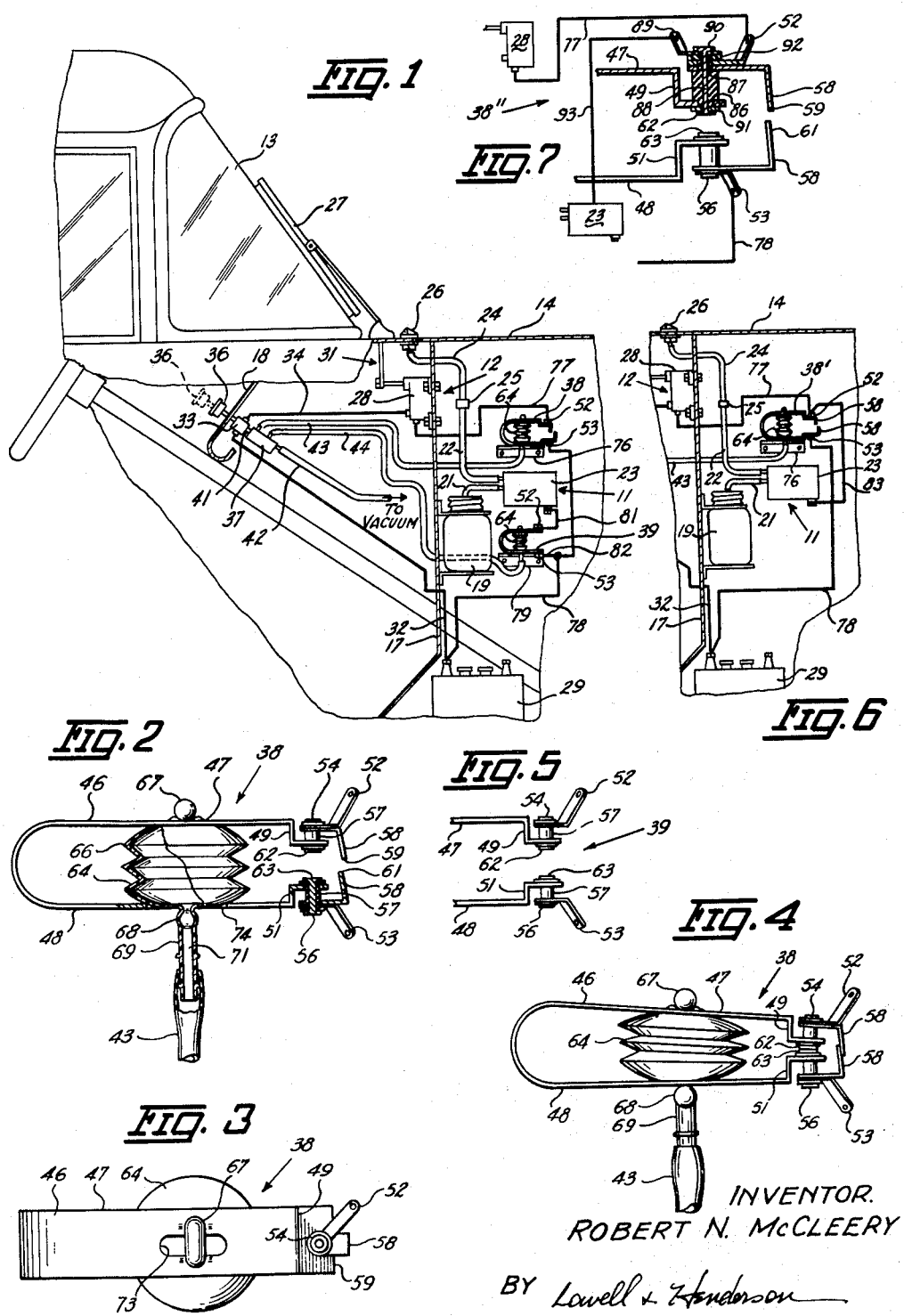
INVENTOR.
ROBERT N. McCLEERY
BY Lowell & Henderson
ATTORNEYS.

United States Patent Office 3,113,190
Patented Dec. 3, 1963

3,113,190
BELLOWS ACTUATED SWITCH
Robert N. McCleery, Detroit, Mich., assignor to The Delman Company, Cookeville, Tenn., a corporation of Tennessee
Filed Jan. 30, 1961, Ser. No. 85,591
5 Claims. (Cl. 200—83)

This invention relates generally to windshield clearing systems and more particularly to a vacuum actuated control system for operating the clearing system.

An object of this invention is to provide in a windshield clearing system a novel time delay arrangement operable to concurrently actuate the wiper and washer unit simultaneously while de-actuating the wiper unit subsequently to the de-actuation of the washer unit.

Another object of this invention is to provide in a windshield clearing system utilizing electrically energized washer and wiper units, a suction operated electric switch including electric terminals directly responsive to the position of a flexible bellows for controlling the operation of the washer and wiper units.

Yet another object of this invention is to provide a vacuum actuated electric switch the terminals of which are movable toward and away from each other depending upon the position of a flexible bellows which is movably reponsive to the application thereto of a subatmospheric pressure.

A further object of this invention is the provision of a vacuum actuated, electric switch incorporating time delay means capable of attaining the above mentioned objectives which is simple, economical and effective.

These objects and other features and advantages of this invention will become readily apparent upon reference to the following description when taken in conjunction with the accompanying drawings, wherein:

FIG. 1 is a fragmentary side elevational view of a vehicle showing the invention in assembled relation therewith;

FIG. 2 is an enlarged detail side elevational view of the vacuum actuated switch of FIG. 1, the switch being in an open position, and with certain parts broken away and shown in section for clarity;

FIG. 3 is a top plan view of the switch of FIG. 2;

FIG. 4 is a view similar to FIG. 2 and showing the switch in a closed position;

FIG. 5 is a fragmentary detail view showing a modified form of terminals for the switch of FIG. 2;

FIG. 6 is a fragmentary view similar to FIG. 1 and showing a modified version of the invention; and FIG. 7 is a fragmentary view similar to FIG. 5 and showing another modified version of the invention, with certain parts shown in section for clarity.

With reference to the drawing and particularly to FIGS. 1–5, inclusive, a vehicle windshield clearing system is disclosed which includes a washer unit and a wiper unit designated generally in FIG. 1 at 11 and 12, respectively. The vehicle is illustrated as having a windshield 13, an engine cowl 14 extended forwardly of the windshield, a fire wall 17 and a dashboard 18.

The washer unit 11 includes a fluid reservoir 19 mounted on the fire wall 17 for supplying fluid through a conduit 21 to an electrically operated fluid pump 23 connected to the vehicle battery 29. The fluid pump 23, upon operation, transmits the fluid through another conduit 22 and a one way check valve 25 to one or more nozzles 26. Each nozzle 26 is mounted on the cowl 14 at a position forwardly of the windshield 13, and is adapted to discharge the fluid upwardly onto the windshield 13 and into the path of movement of a windshield wiper blade 27, which forms a part of the wiper unit 12.

The wiper unit 12 also includes an electric wiper motor 28 of a conventional type which is mounted on the fire wall 17, and which is energized by the battery 29 to drive the wiper blade 27 in an oscillating manner across the windshield 13 by means of the usual transmission mechanism indicated generally at 31 (FIG. 1). The battery 29 is connected in an electric circuit which includes a lead 32 to an on-off rotatable hand control switch 33 mounted on the dashboard 18, and another lead 34 connected between the control switch 33 and the wiper motor 28. For independent operation of the wiper motor 28 and thus the wiper unit 12, a knob 36 on the control switch is merely rotated between on and off positions.

For initiating operation of the washer unit 11 and the wiper unit 12 concurrently, and for providing a delayed de-actuation of the wiper unit 12 relative to de-actuation of the washer unit 11, a vacuum actuated control system is provided. The control system comprises a vacuum control device 37 (FIG. 1) attached to the switch 33, a first bellows switch unit 38 (FIGS. 1 and 2) connected in the electric circuit for the wiper motor 28, and a second bellows switch unit 39 connetced in the electric circuit for the fluid pump 23. The vacuum control device 37 consists of valve structure wherein an enclosed slide valve (not shown) is attached, via a reciprocal rod 41, to the control switch knob 36 for a push-pull movement. The interior of the vacuum control device 37 is in fluid communication through a conduit 42 with a source of subatmospheric pressure, such as the intake manifold of the vehicle, and is also in fluid communication with a pair of feed conduits 43 and 44.

The arrangement of the vacuum control device 37 is such, for example, that when the control knob 36 is in the full line position of FIG. 1, the slide valve closes off the supply of subatmospheric pressure from the main conduit 42 to the feed conduits 43 and 44. However, when the control knob 36 is pulled outwardly from the dashboard 18 to the dotted line position of FIG. 1, the feed conduits 43 and 44 are opened to the main conduit 42. Rotation of the control knob 36 does not in any way affect the control of the operation of vacuum control device 37.

Referring particularly to FIGS. 2–4, the first bellows switch unit 38 is illustrated as comprising a U-shaped, flexible spring steel retainer 46 having a pair of parallel arms 47 and 48 with right angularly offset terminal ends 49 and 51, respectively. The retainer 46 is illustrated in FIG. 2 in its normal position with the arms 47 and 48 in parallel relation with their ends 49 and 51 spaced apart. A pair of electrical leaf or tab terminals 52 and 53 are secured to the arm ends 49 and 51 by a pair of conductive plugs 54 and 56 each of which is inserted through a sleeve 57 connected to an arm end 49 and 51. The sleeves 57 act as insulators between the arm ends and the plugs 54 and 56.

In the embodiment of the first bellows switch unit 38 of FIG. 2, a pair of conductive brushes or plates 58 are also secured to the plugs 54 and 56 and are bent toward each other so that the normal spacing between the adjacent tips 59 and 61 of the brushes is less than the normal spacing between the plug faces 62 and 63, respectively. It can therefore be seen that the terminals 52 and 53 are electrically connected upon engagement of the brushes 58 with each other, which engagement occurs prior to engagement of the plug faces 62 and 63. It is to be noted that the brushes 58 are slightly inclined relative to each other so as to provide a positive engagement when the arms 47 and 48 are flexed toward each other, and also to effect a self-cleaning action during use.

To bring the arm ends 49 and 51 together, so as to cause the brushes 58 and the plug faces 62 and 63 to engage, a flexible hollow plastic bellows 64 (FIG. 2) of blow molded type is formed with a thin wall 66. At one end the bellows 64 is provided with an elongated knob 67, and at its opposite end with another elongated knob 68 having a projected fluid fitting 69 integral with the wall 66. A central bore 71 is formed through the fitting 69 and the knob 68.

By providing a pair of transversely aligned, elongated slots 73 and 74 (FIGS. 2 and 3) running lengthwise in the retainer arms 47 and 48 and of a length sufficient to receive the knobs 67 and 68, it can readily be seen that the bellows 64 can be connected between the arms 47 and 48 by simply inserting the knobs through their respective slots and turning the bellows 64 ninety degrees.

The second bellows switch unit 39 (FIGS. 1 and 5) is identical to the first unit 38 with the exception that the brushes 58 of the first unit 38 are eliminated in the second unit 39, as best illustrated in FIG. 5. Thus upon the application of a subatmospheric pressure through fluid fittings 69 to the interior of the bellows 64 of both units 38 and 39, the bellows will contract from their normally expanded positions to a collapsed position, as best indicated in FIG. 4. Then upon a release or withdrawal of the subatmospheric pressure, the bellows 64 will both return to their expanded positions (FIGS. 1 and 2). As the spacing between the plug faces 62 and 63 (FIG. 5) of the second switch unit 39 is greater than the spacing between the brush tips 59 and 61 of the first unit 38, it can readily be seen that the circuit of the first switch unit 38 remains closed longer than the circuit in which the second switch unit 39 is connected.

In the assembly of the vacuum actuated control system, the first bellows switch unit 38 (FIG. 1) is fluid connected by the conduit 43 between its fitting 69 (FIG. 2) and the vacuum control device 37. The lower leg 48 of the spring retainer 46 is stationarily mounted on a bracket 76 which is secured, for example, to an inside wall of the vehicle engine compartment. One terminal 52 is electrically connected by a lead 77 to the wiper motor 28, and the other terminal 53 is connected by a lead 78 to the battery 29. The second bellows switch unit 39 (FIG. 1) is fluid connected by the conduit 44 from its nozzle 69 to the vacuum control device 37, and is mounted at its lower leg 48 to a stationary bracket 79. The upper terminal 52 of the unit 39 is connected by a lead 81 to the fluid pump 23 and the lower terminal 53 is connected via leads 82 and 78 to the battery 29.

In the operation of the clearing system of FIGS. 1–5, as mentioned hereinbefore, independent operation of the wiper unit 12 is accomplished by rotating the control knob 36 between on-off positions where the electric circuit for the wiper motor 28 is either closed to operate the motor, or is open. For coordinated operation of both the wiper and washer units 12 and 11, respectively, the control knob 36 is pulled from the full line position of FIG. 1 to the dotted line position. This movement of the knob 36 is transmitted through the rod 41 to the vacuum control device 37 to permit the subatmospheric pressure in the main conduit 42 to be applied through the feed conduits 43 and 44 to the interiors of the bellows 64 of the first and second bellows switch units 38 and 39, respectively.

By virtue of atmospheric pressure acting on the outside of both bellows 64, they collapse (FIG. 4) and in so doing pull down the free leg 47 of each spring retainer 46 toward the stationary leg 48 until the plug faces 62 and 63 contact each other to stop further movement of the leg 47. It can readily be seen that as the brushes 58 (FIG. 2) in the first unit 38 engage, the electric circuit to the wiper motor 28 is closed and the motor 28 operates to oscillate the wiper blade 27. Also, when the plug faces 62 and 63 of the second unit 39 contact, the electric circuit to the fluid pump 23 is closed and the pump 23 operates to discharge fluid through the nozzle 26 against the windshield 13.

After both washer and wiper units 11 and 12 are operating, to de-actuate or shut off both units the operator releases the control knob 36 so that it moves back to its full line position of FIG. 1, the knob 36 being ordinarily spring biased toward that position. This movement closes off the fluid conduits 43 and 44 from the main conduit 42 and opens them—within the vacuum control 37—to atmosphere. As the interiors of the bellows 64 are therefore opened to atmospheric pressure, they each return from their collapsed position (FIG. 4) to their original expanded position (FIG. 2). In so doing, as the spacing between the end tips 59 and 61 of the first bellows unit 38 (FIG. 2) is less than that between the plug faces 62 and 63 of the second bellows unit 39 (FIG. 5), the circuit of the wiper motor 28 is opened after the circuit of the fluid pump 23 is opened. This provides for a timed delay in the de-actuation of the wiper unit 12 relative to the de-actuation of the washer unit 11. The length of the delay can be varied by changing the spacing relationship between the brushes 58 and the plug faces 62 and 63.

It is to be noted that the necessity for manually holding the control knob 36 in the dotted line position of FIG. 1 until desirable to de-actuate the washer and wiper units 11 and 12 can be modified so that to actuate the units, the knob 36 need only be pulled out momentarily. This can readily be accomplished by incorporating a vacuum bleed valve unit (not shown) in fluid communication with both feed conduits 43 and 44. The vacuum bleed valve unit would open the feed conduits 43 and 44 to the main conduit 42 upon outward movement of the control knob 36, and then upon release of the knob 36 would automatically delay atmospheric pressure returning to the pair of bellows 64 for a predetermined period of time.

Referring to FIG. 6 where a modified version of the vacuum actuated control system is shown, like parts being indicated by like numerals, the arrangement is substantially identical with that of FIG. 1 with the main exception that only one bellows switch unit 38' is used. In assembly, the unit 38' of FIG. 6 is fluid connected by a conduit 43 to a vacuum control device 37, and is electrically connected at one terminal 53 by an electric lead 78 to the battery. The other terminal 52 has a pair of leads 77 and 83 to the wiper motor 28 and to the fluid pump 23, respectively.

In operation, independent control of the wiper motor 28 of FIG. 6 is accomplished in the same way as described for the system of FIG. 1. Coordinated control of the washer and wiper units 11 and 12 of FIG. 6 is initiated by pulling out the control knob 36, whereupon a subatmospheric pressure is transmitted through the vacuum control device 37 and the conduit 43 to the single bellows 64 of the unit 38'. Upon the collapse of the bellows 64, the brushes 58 of the unit 38' engage and battery current is directed to the wiper motor 28 and the fluid pump 23. Thus, concurrent discharge of fluid upon the windshield 13 and oscillation of the wiper blade 27 is obtained. When the operator releases the control knob 36, the bellows 64 of the bellows unit 38' expands and both the wiper motor 28 and the fluid pump 23 cease to operate as the electric circuit is open.

Another modified version of the vacuum actuated control system is shown in FIG. 7, like parts being indicated by like numerals. The arrangement is similar to that of FIG. 6, with exceptions noted hereinafter, whereby a timed delay of the de-actuation of the wiper unit 12 relative to the de-actuation of the washer unit 11 is obtained.

Referring to FIG. 7, a single bellows switch unit 38″ is provided, wherein the terminal end 49 of the retainer arm 47 has an insulating sleeve 86 secured thereto. A tab terminal 52 and a brush 58 are mounted in contacting relation over the upper end 87 of the sleeve 86, and a conductor plug 88 is inserted through the center of the sleeve 86. The sleeve 86 is insulated from the terminal end 49 by an insulated washer 91, and another insulated washer 92 is placed between the tab terminal 52 and another tab terminal 89 mounted below the top 90 of the plug 88.

By this arrangement the terminal 52 and the brush 58 are in electrical contact, but are insulated from the plug 88 and terminal 89 also electrically contacting. Thus, current in the battery line 78 transmitted to the lower terminal 53 will take one path via the plug faces 62 and 63, the terminal 89 and a line 93 to the fluid pump 23, upon engagement of the plug faces 62 and 63. However, when the brushes 58 engage, the current is also transmitted from the battery line 78 via another path through the brushes 58, the terminal 52, and the line 77 to the wiper motor 28.

In operation of the modified system of FIG. 7, coordinated control of the washer and wiper units 11 and 12 is again initiated by pulling out the control knob 36, whereupon subatmospheric pressure is transmitted to the single bellows 64 (see FIG. 6) which the unit 38″ embodies. Upon a collapse of the bellows 64 the brushes 58 engage as do the plug faces 62 and 63. The wiper motor 28 (FIG. 7) is energized by battery current transmitted through the brushes 58, the terminal 52 and the line 77, while the fluid pump 23 is energized by battery current through the plugs 56 and 88, the terminal 89 and the line 93.

When the bellows 64 expands, due to the release of the control knob 36 which closes the vacuum control device to the suction pressure of the main conduit 42 and opens the single bellows line 43 to atmospheric pressure, a delayed de-actuation of the wiper motor 28 is obtained. This is provided by the plug faces 62 and 63 (FIG. 7) separating prior to the separation of the brushes 58, as the gap between the faces is smaller than that between the brushes. Thus, upon expansion of the bellows 64, current to the fluid pump 23 is cut off by the separation of the faces 62 and 63, and subsequent in time, current to the wiper motor 28 is cut off by the disengagement of the brushes 58. The result is a delayed de-actuation of the wiper motor 28 relative to the de-actuation of the pump 23, whereby the wiper blade 27 (FIG. 1) continues to be oscillated across the windshield 13 a predetermined period of time after fluid ejected from the nozzle 26 has stopped.

In summation, a control system for a windshield clearing system is disclosed, where the basis for the control is a vacuum actuated device comprising a collapsible bellows and an electric switch operatively connected to and providing a mounting for the bellows, and with the switch being directly responsive to the expansion and contraction of the bellows for opening and closing an electric circuit.

Although one embodiment and a modification thereof have been disclosed herein, various alterations and other modifications can be made thereto without departing from the scope of the invention as defined by the appended claims.

I claim:

1. A vacuum actuated electric switch comprising a member of yieldable material having a reversely bent shape so as to form a base arm adapted for stationary mounting and a lever arm yieldably movable toward said base arm, said lever arm movable automatically away from said base arm subsequent to movement toward said base arm, a pair of electric terminals secured one on each arm in normally spaced relation and engageable with each other on movement of said arms together, and a flexible bellows interconnected to and extended between said arms, said bellows responsive to the application thereto of a fluid pressure and movable from a normally expanded position to a collapsed position, said arms pulled together until said terminals contact upon movement of said bellows to said collapsed position, said bellows returnable to said normally expanded position whereby said terminals are separated upon the withdrawal of the pressure applied thereto.

2. A vacuum actuated electric switch comprising a flexible member having a pair of spaced arms movable relative to each other, a pair of electric terminals secured one on each arm in normally spaced relation and engageable with each other on movement of said arms together, a pair of leaf terminals secured one on each arm and engageable with each other on movement of said arms together, the spacing between said leaf terminals being less than the spacing between said electric terminal whereby upon movement of said arms together said leaf terminals contact each other prior to contact by said electric terminals and disengage after disengagement of said electric terminals, and a flexible bellows interconnected to and extended between said spaced arms in a normally expanded position, said bellows responsive to the application thereto of a fluid pressure and returnably movable from said normally expanded position to a contracted position wherein said electric terminals are in engagement.

3. A vacuum actuated electric switch comprising a flexible member having a pair of spaced arms movable relative to each other, said arms having a pair of transversely aligned, elongated slots formed therein and having further a pair of electric terminals on the ends thereof, said terminals normally spaced apart and being engageable upon movement of said arms, and a hollow flexible bellows having a pair of elongated knobs at opposite ends of said bellows, a fitting formed on one of said knobs and said fitting and knob formation having a bore formed therein leading to the interior of said bellows, each of said knobs insertable through a respective slot whereby upon rotation of said bellows a predetermined amount said bellows is interconnected to and extended between said arms in a normally expanded position, said bellows responsive to the application therein of a subatmospheric pressure applied through said bore and movable from said normally expanded position to a contracted position wherein said arms are pulled toward each other and said terminals are brought into engagement.

4. A vacuum actuated electric switch comprising a flexible member having a pair of spaced arms movable relative to each other, a pair of electric terminals secured one on each arm and having faces normally spaced apart a first distance, said terminal faces engageable with each other on movement of said arms toward each other, a pair of electric leaf terminals secured one on each arm and having end portions normally spaced apart a second distance different from said first distance, one of said leaf terminals in electric contact with one of said terminals, the other of said leaf terminals insulated from the other of said terminals, and a flexible bellows interconnected to and extended between said arms, said bellows responsive to the application thereto of a fluid pressure and movable from a normally expanded position to a collapsed position wherein said terminals engage and said leaf terminals engage.

5. A fluid pressure actuated electric switch comprising a member of yieldable material having a reversely bent shape so as to form a base arm adapted for stationary mounting and a lever arm yieldably movable toward said base arm, said lever arm movable automatically away from said base arm subsequent to movement toward said base arm, a pair of electric terminals secured one on each arm in normally spaced relation and engageable with each other on movement of said arms together, and bellows means interconnected to said arms, said bellows means responsive to the application thereto of a fluid pressure and movable between expanded and collapsed positions therefor, said arms pulled together until said terminals contact upon movement of said bellows means to one of said positions therefor, said bellows means returnable by the lever arm of said member to the other position therefor whereby said terminals are separated upon the withdrawal of the pressure applied thereto.

References Cited in the file of this patent

UNITED STATES PATENTS

| | | |
|---|---|---|
| 2,877,485 | Oishei | Mar. 17, 1959 |
| 2,926,376 | Deibel et al. | Mar. 1, 1960 |
| 3,017,650 | Schaal | Jan. 23, 1962 |